United States Patent [19]

Barrett

[11] Patent Number: 5,431,033

[45] Date of Patent: Jul. 11, 1995

[54] STEERING WHEEL AND IGNITION LOCKING DEVICE FOR A VEHICLE

[76] Inventor: Joseph S. Barrett, 20330 NW. 35th Ave., Miami, Fla. 33056

[21] Appl. No.: 54,746

[22] Filed: Apr. 28, 1993

[51] Int. Cl.$^6$ .................. B60R 25/02; E05B 17/14
[52] U.S. Cl. .................................... 70/209; 70/211; 70/237; 70/238; 70/428; 70/455
[58] Field of Search ............... 70/209, 225, 226, 237, 70/238, 211, 210, 212-214, 455, 423-428

[56] References Cited

U.S. PATENT DOCUMENTS

| 1,228,123 | 5/1917 | McDermott | 70/212 |
|---|---|---|---|
| 1,267,687 | 5/1918 | Nichols | 70/212 |
| 1,346,837 | 7/1920 | Miller | 70/212 |
| 1,414,991 | 5/1922 | McKeage | 70/213 |
| 1,421,401 | 7/1922 | Byers | 70/212 |
| 1,450,943 | 4/1923 | Daniels | 70/211 |
| 1,488,802 | 4/1924 | Blaney | 70/212 |
| 2,247,621 | 7/1941 | Speer | 70/380 |
| 4,008,590 | 2/1977 | Berkowitz et al. | 70/424 |
| 4,304,111 | 12/1981 | Nolin | 70/424 X |
| 4,658,613 | 4/1987 | Solow | 70/427 |
| 4,696,173 | 9/1987 | Lee | 70/427 |
| 4,974,433 | 12/1990 | Wang | 70/237 X |
| 4,982,810 | 1/1991 | Toy | 70/237 X |
| 5,007,259 | 4/1991 | Mellard | 70/226 X |
| 5,097,685 | 3/1992 | Lien | 70/226 X |
| 5,113,674 | 5/1992 | LiCausi | 70/237 X |
| 5,119,651 | 6/1992 | Yang | 70/209 X |

FOREIGN PATENT DOCUMENTS

| 163719 | 12/1948 | Austria | 70/211 |
|---|---|---|---|
| 521174 | 3/1921 | France | 70/212 |
| 528287 | 11/1921 | France | 70/212 |
| 550430 | 12/1922 | France | 70/213 |
| 732509 | 9/1932 | France | 70/212 |
| 419557 | 4/1947 | Italy | 70/212 |

Primary Examiner—Lloyd A. Gall
Attorney, Agent, or Firm—Malin, Haley, DiMaggio & Crosby

[57] ABSTRACT

An anti-theft device for a vehicle that includes a combination of a steering wheel lock and an ignition cover to prevent access to the ignition and to prevent use of the steering wheel or access to the steering wheel center hub when the device is in place. The purpose of the device is to prevent the theft of an automobile or truck utilizing the device.

10 Claims, 7 Drawing Sheets

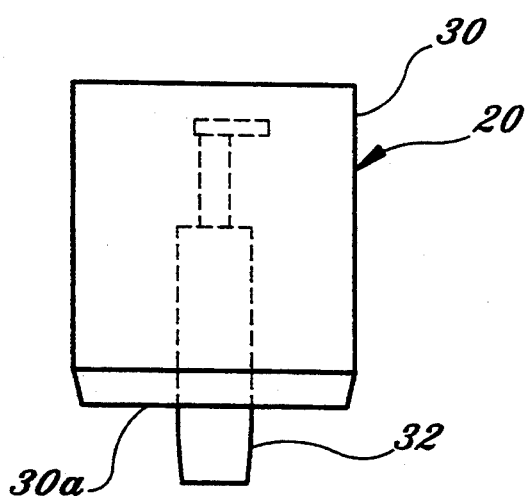
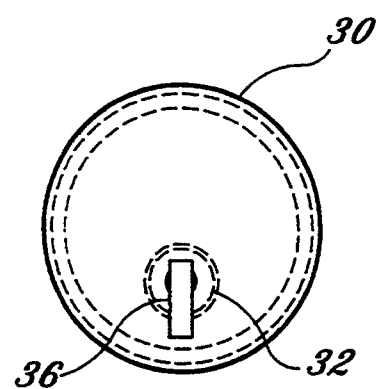
Fig. 7                Fig. 8
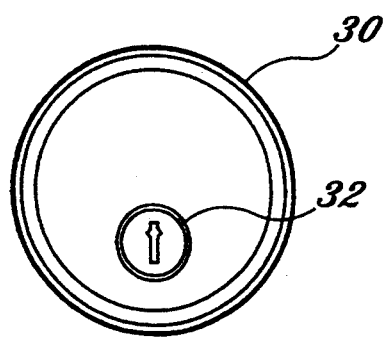
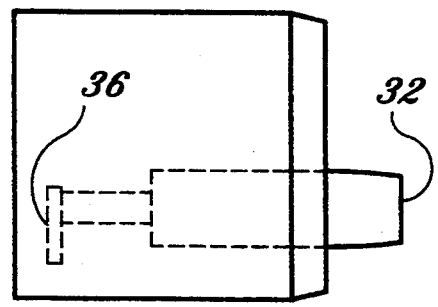
Fig. 9                Fig. 10

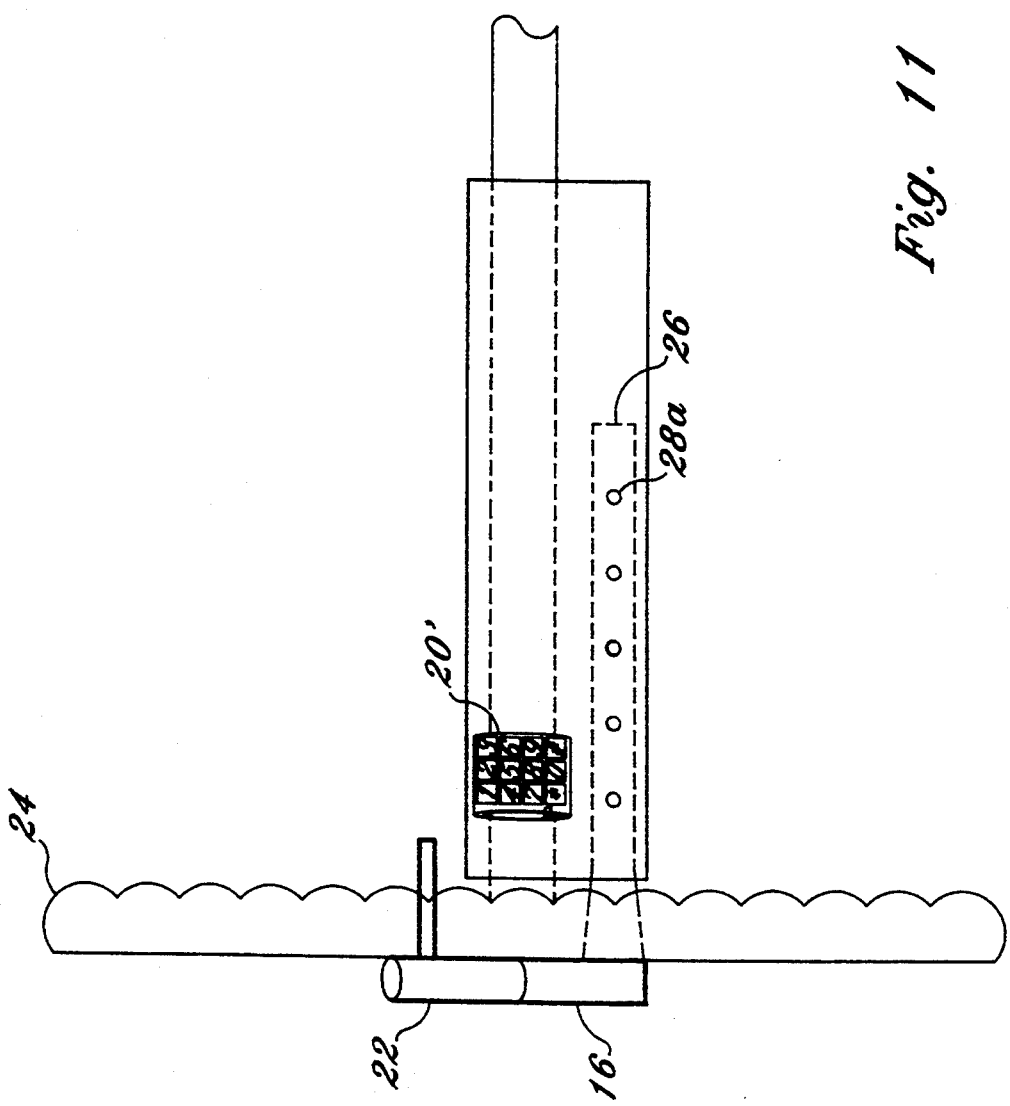

STEERING WHEEL AND IGNITION LOCKING DEVICE FOR A VEHICLE

BACKGROUND OF THE INVENTION

1. Field of the Invention

This invention relates generally to a device for protecting an automobile from being stolen, and in particular, to a steering wheel and ignition locking device to prevent the theft of an automobile or similar vehicle.

2. Description of the Prior Art

Automobile theft has become a daily common occurrence in most large cities. Several thousand vehicles are stolen each day in the United States. Numerous devices have recently been employed to reduce or eliminate automobile theft. For instance, a common steering wheel lock is marketed that basically comprises an adjustable rod that fits across the steering wheel, so that the elongation of the adjustable rod makes it very difficult to turn the wheel. One of the drawbacks of such an adjustable rod across the steering wheel is the fact that it can be easily bent or cut in half with a hacksaw or the like. Many of these devices are not strong enough for locking a steering wheel, because of the desire for something light and portable. Other devices employ electronic systems hidden in the vehicle that give off a signal if the device is caused to move. These are very expensive and not always reliable. Another common method employed in automobile theft is "hot wiring," wherein ignition wires or master keys are utilized by the automobile thief to either bypass or activate the ignition in starting the car. Ignition locks have been provided that include buttons for mechanically locking the steering wheel if the key is not inserted properly, but this may be bypassed as well.

The present invention overcomes the problems of the background art by providing a vehicle locking system that immobilizes the steering wheel and simultaneously prevents contact or tampering with the ignition key insert system. The device immobilizes the steering wheel while simultaneously making the ignition inaccessible with the protection of a surrounding barrier. The present invention includes three major components, one of which is permanently installed on the vehicle's steering column, called the base unit, another which attaches to the steering wheel and the third which comprises a removable ignition cover unit that attaches to the base unit when it is desired to secure and lock the vehicle. By using the present invention, there is no access to the ignition key insert and the steering wheel is immobilized until the barriers are removed.

SUMMARY OF THE INVENTION

This invention is comprised of a first half, or base housing that permanently attaches to the steering column of a vehicle, a second half, or removable steering wheel barrier that engages the base housing, preventing rotation of the steering wheel, and an ignition cover barrier that may have a corresponding fastener for key locking the ignition barrier to the base housing.

In accordance with the invention, a permanently mounted tubular base housing attaches to the steering column of almost every vehicle, using fasteners such as Allen screws or the like that couple together the steering wheel barrier to the permanently mounted housing. The permanently mounted housing is essentially a cylindrical shell having a first tubular passage that includes threaded female openings on one side and alignable threaded openings on the other side in the column through which threaded fasteners are used to permanently mount the housing to the steering wheel column.

A steering wheel barrier fits in a second tubular passage or channel of the base unit. This barrier comprises a central frame with a pair of bars attached and an elongated shaft that is removably locked into the second passage of the permanently attached housing while it is secured. The removable barrier has a key locking mechanism that physically attaches the barrier to the housing on the steering column in a locked manner. The barrier engages the steering wheel to prevent it from rotating. More than one pin may be employed to engage one or more portions of the steering wheel column and housing to secure the barrier for preventing rotation of the steering wheel. In this arrangement, the removable steering wheel barrier may be locked in place with the same key that locks the ignition cover discussed hereto. The central frame comprises a generally rectangular portion that fits over the center of the steering column. The central frame has two rigid bars attached thereto and that includes an elongated shaft extending therefrom having a plurality of holes. The removable tubular shaft prevents steering wheel rotation when it is inserted into the corresponding tubular channel defined by the permanent housing on the steering wheel. This shaft is orthogonal to the bars and frame to meet its objectives. Due to the rigid, sturdy bars and shaft connected to the housing, the only way the steering wheel can be moved is by removing the device.

Another objective of the present invention is to provide a combination locking system that has a central actuation so that both the ignition cover and the steering wheel barrier cannot be moved without removing the lock system.

The ignition protection device includes a rigid, cylindrical housing that fits over the auto ignition to prevent access to the ignition assembly that starts the car. The cylindrical housing itself is actuated by a key to allow it to be removed and includes a movable locking member that engages a slot in the permanently installed housing mounted on the steering wheel. The removable locking member comprises a lever arm that is rotated by a key actuated device. Once the lever arm is moved from the slot, the entire cylindrical housing can be removed to allow access to the ignition for key insertion.

Therefore, there are two critical locking elements in the present invention. A steering wheel lock having a shaft that engages the permanent housing is locked in place to the steering wheel. The second element is a separate member that comprises an ignition protection device that rigidly attaches to the permanent housing to prevent access to the ignition.

It is an object of this invention to provide an improved vehicle locking device to protect against theft that includes both the steering wheel lock and an ignition cover utilized in the same device.

It is another object of this invention to provide for an easily disengaged, key-actuated locking system for both the steering wheel and ignition cover to prevent automobile theft.

And yet still another object of this invention is to provide an improved steering and ignition combination locking device for an automobile or truck to prevent theft that can be actuated through a single key mechanism.

BRIEF DESCRIPTION OF THE DRAWINGS

FIG. 7 shows a top plan view of the ignition covering device in accordance with the present invention.

FIG. 8 shows a front view of the ignition cover of FIG. 7.

FIG. 9 shows a back elevational view of the ignition cover in accordance with the present invention.

FIG. 10 shows a side elevational view of the ignition cover in accordance with the present invention.

FIG. 11 shows a side elevational view, partially broken away of an ignition cover that includes a manual digital locking device for locking the ignition cover.

DESCRIPTION OF THE PREFERRED EMBODIMENT

Figure 1:
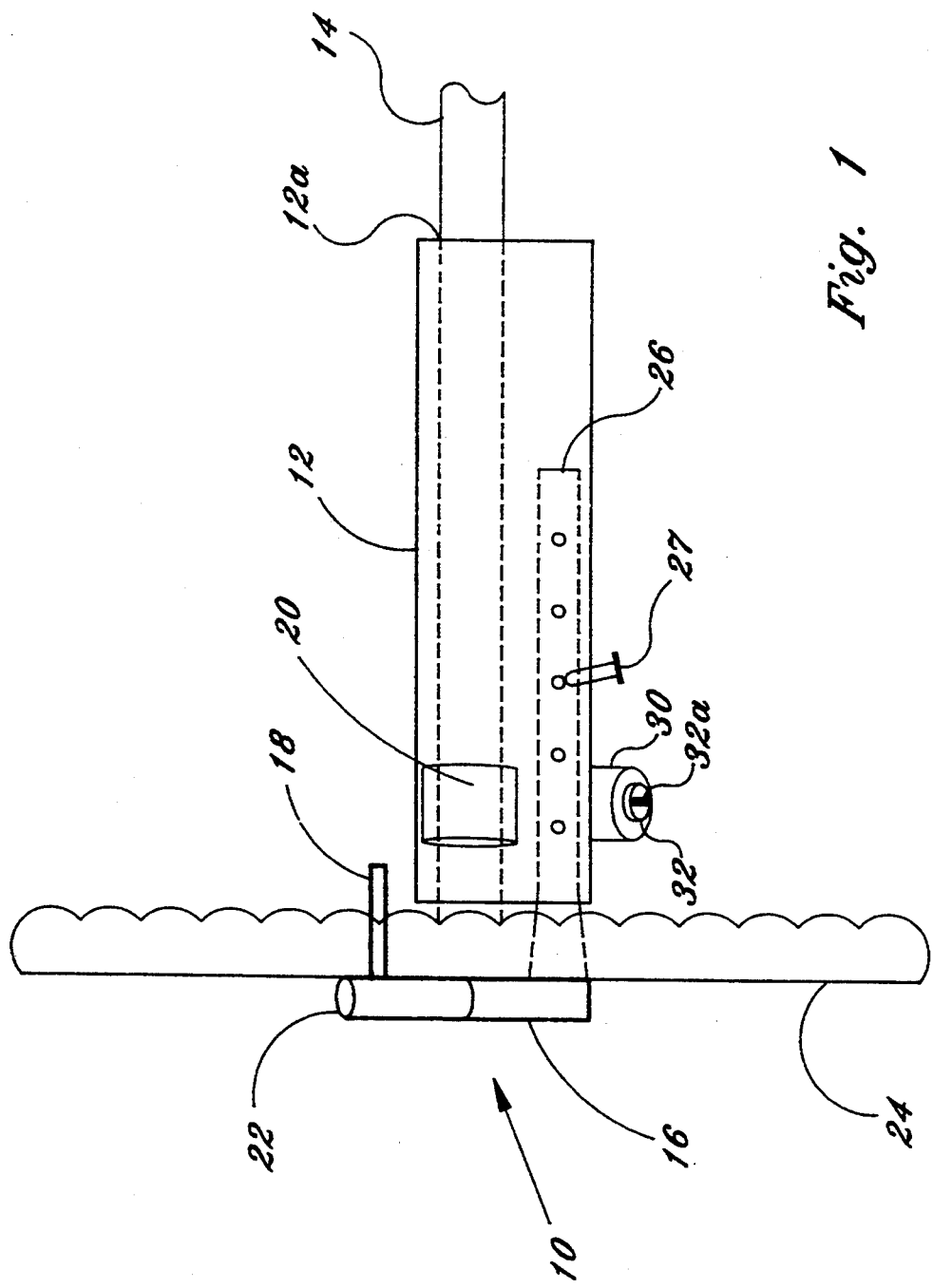
FIG. 1 shows a side elevational view of the present invention, with the steering wheel lock and the ignition protection device installed.
Figure 5:
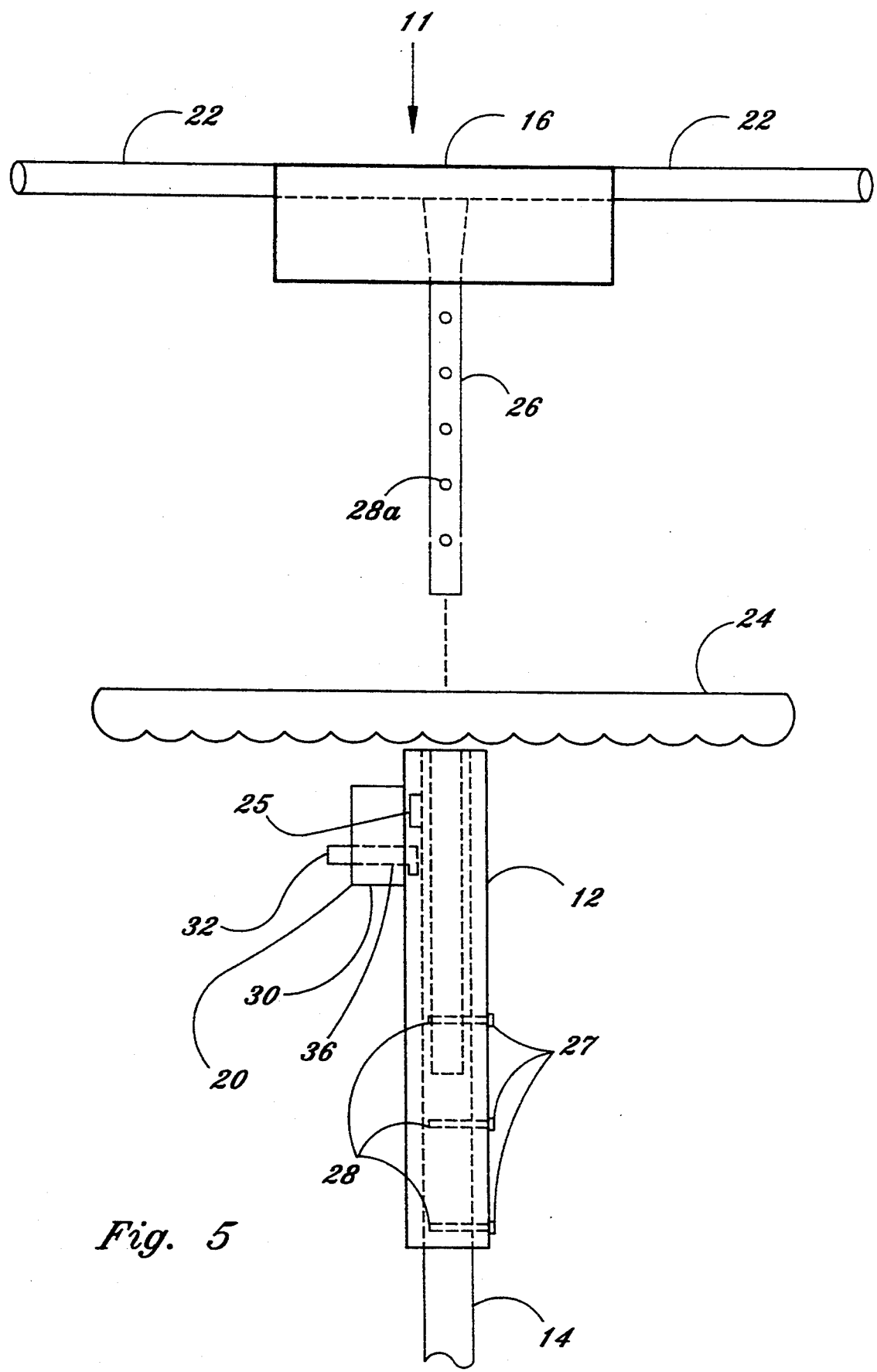
FIG. 5 shows a top exploded view in plan of the present invention.

Referring now to the drawings, and in particular to FIG. 1, the present invention is shown generally at 10 attached to a conventional automobile steering column 14. The invention includes a permanently mounted housing 12 that is elliptical in cross section and has two passages or channels. A first channel 12a fits around the steering column 14 from top to bottom, and a second channel 26a receives a steering wheel locking device 11. The steering wheel locking device 11 or barrier comprises a central frame 16, a pair of rigid arms 22 that extend from the steering wheel somewhat radially, and a rigid tubular shaft 26 that prevents rotation of the steering wheel. The device further includes an ignition cover 20 that is locked in place with a key to cover the automobile key-actuated ignition switch 25 to prevent the insertion of a key. As shown in FIG. 1, the steering wheel is prevented from moving by the shaft 26 when it is locked into housing 12. The automobile ignition is covered by an ignition cover 20 which rigidly attaches to the permanent housing 12. With the use of the present invention, the device is attachable to almost every vehicle steering wheel column and will protect an ignition mounted in the steering wheel column. If the ignition switch is mounted in the dashboard, then a different device would be utilized to protect the automobile ignition. A plurality of fasteners or removable pins 27 are inserted through corresponding apertures 28 to lock shaft 26 and housing 12 to column 14. The shaft 26 has apertures 28a which if aligned with apertures 28 defined by the housing 12 would allow the first and second halves 11, 12 to be securely interlocked by fasteners 27. The fasteners 27 typically penetrate apertures 28, as seen in FIGS. 3 and 5 and penetrate the column 14 through holes bored therein for securing the housing 12 to the column 14. At least one pin 27 may be covered by the ignition cover 20 as shown in FIG. 2 or it may be left exposed as depicted in FIG. 1.

Figure 2:
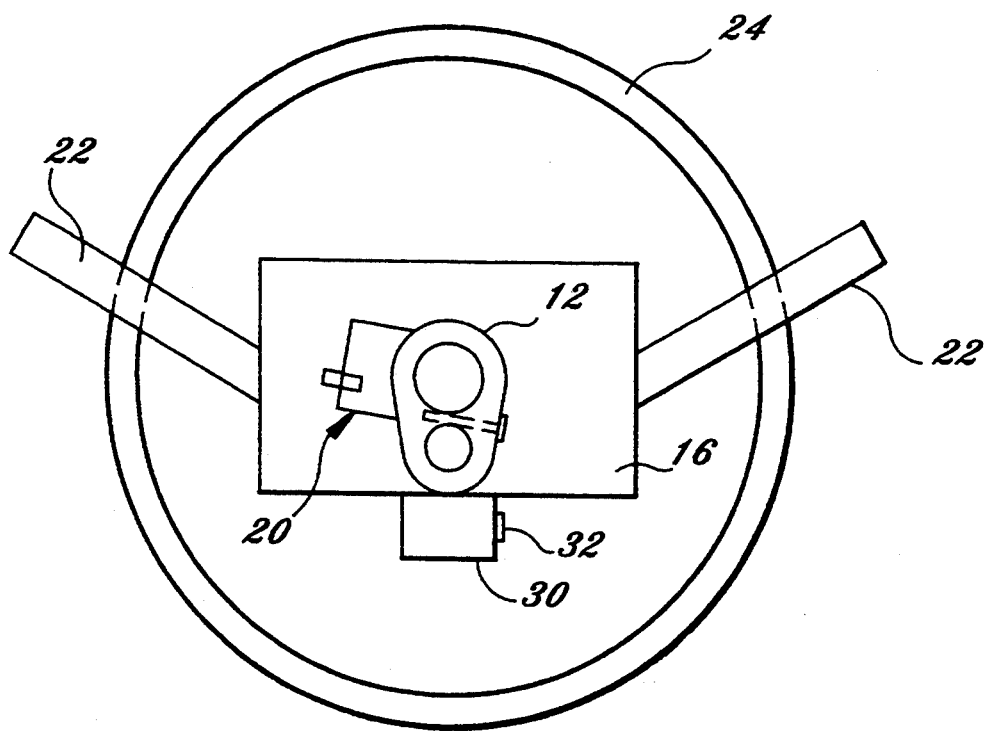
FIG. 2 shows a back elevational view of the present invention.
Figure 3:
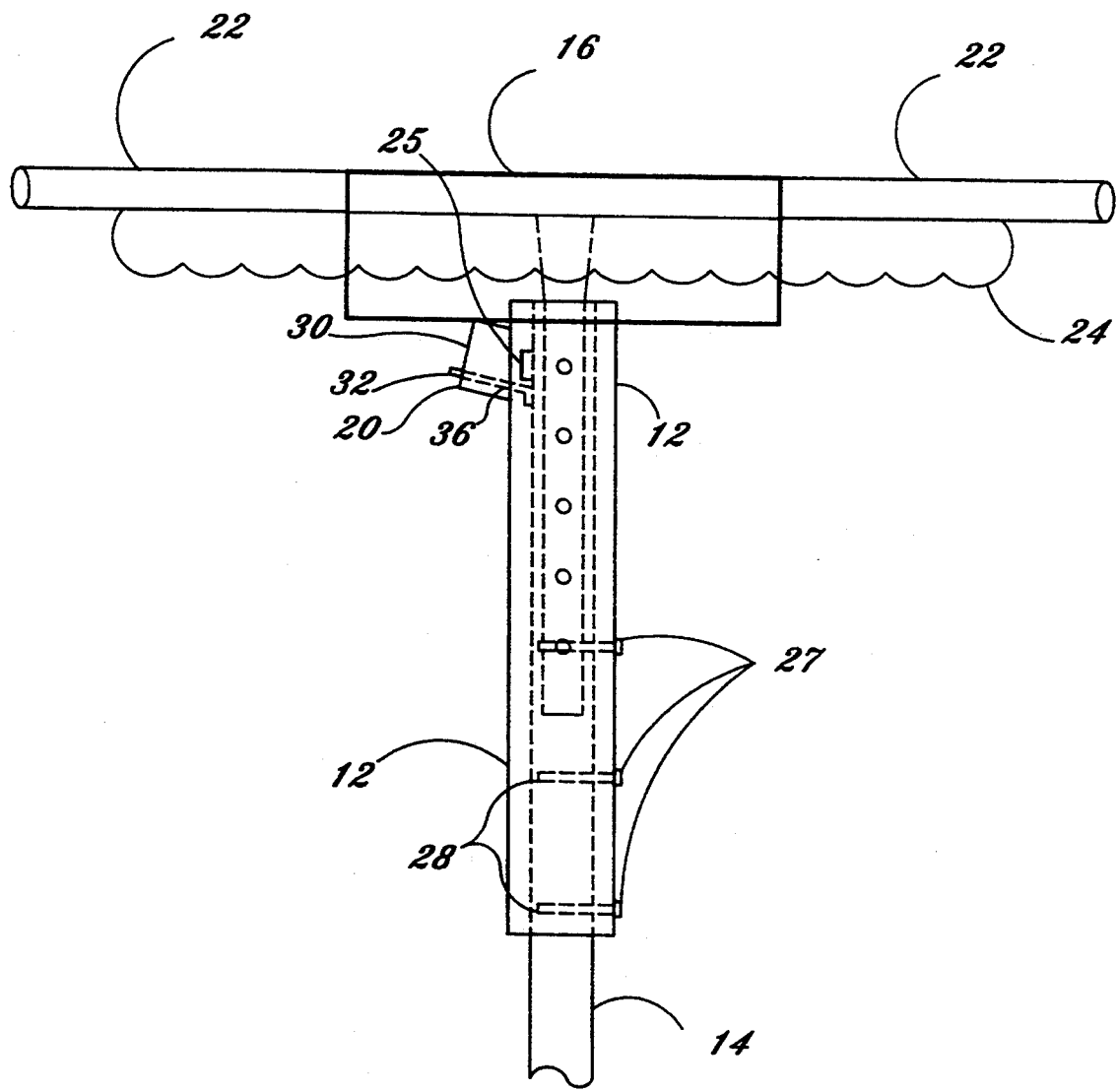
FIG. 3 shows a top plan view of the present invention.

The back side of the invention is shown in FIG. 2 wherein the ignition cover 20 is mounted firmly to housing 12 which is attached to the steering column 14. The radial steering wheel locking arms 22 protrude beyond the steering wheel itself.

A top view FIG. 3 shows the locking arms 22 extending over the steering wheel. The ignition cover 20 is provided and includes a locking mechanism explained hereto. The permanent housing 12 is attached over the steering column 14 by the plurality of fasteners 27, that may firmly lock the two halves of the invention 10 around the steering column 14 when it is initially installed. The pins 27 may comprise allen screws, bolts or similar fasteners which are used to both individually secure the housing 12 to column 14 and to simultaneously secure the housing 12 and the shaft 26 to the steering column 14 as shown in FIG. 3.

Figure 4:
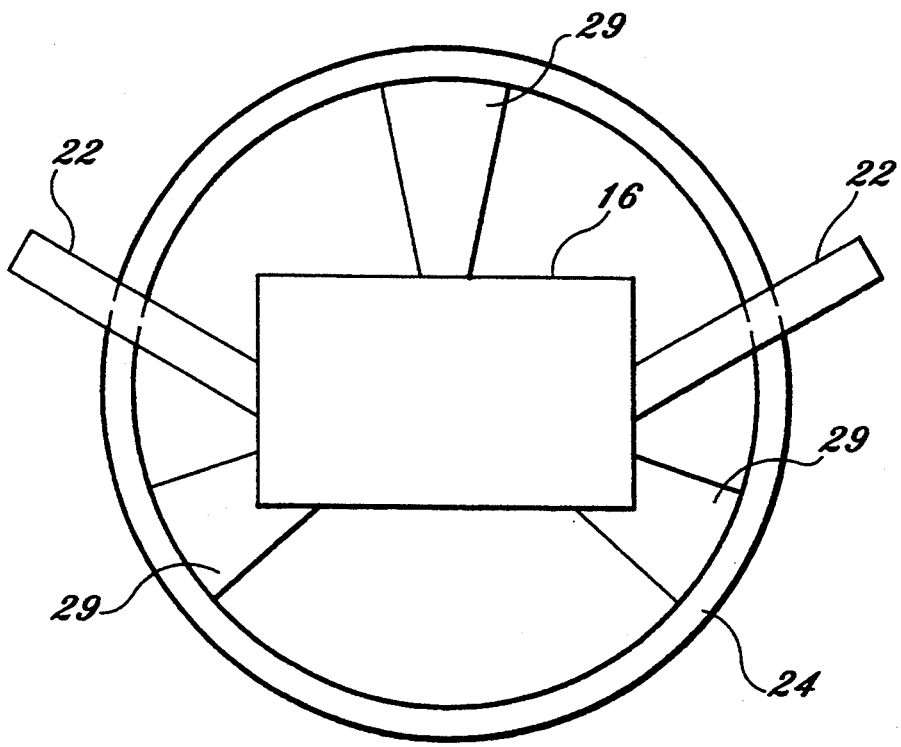
FIG. 4 shows a front view of the present invention.

FIG. 4 shows the central frame 16, which includes rigidly attached arms 22 and the orthogonal shaft 26. The central frame 16 provides a protective covering which prevents any tampering with the steering wheel 24 or column 14. Thus, access to the steering wheel column 14 is prevented, since it is shielded by the central frame 16.

The steering wheel locking barrier 11 is shown in FIG. 5 prior to attachment to housing 12 which is found on the steering wheel column 14. The rigid arms 22, the protective central frame 16 and the rigid shaft 26 comprise a steering wheel barrier 11 while housing 12 permanently and rigidly affixes to the steering column 14. The rigid shaft 26 fits into the second channel 26a defined in the permanent housing 12 and includes a plurality of apertures 28a that allow it to be locked in place with fasteners 27 and with a locking mechanism 32'. The locking mechanism may be key actuated and may work in conjunction with the key used to actuate the locking mechanism 32 of the ignition switch cover 20. The ignition cover 20 may also cover and securely conceal one fastener 27.

Figure 6:
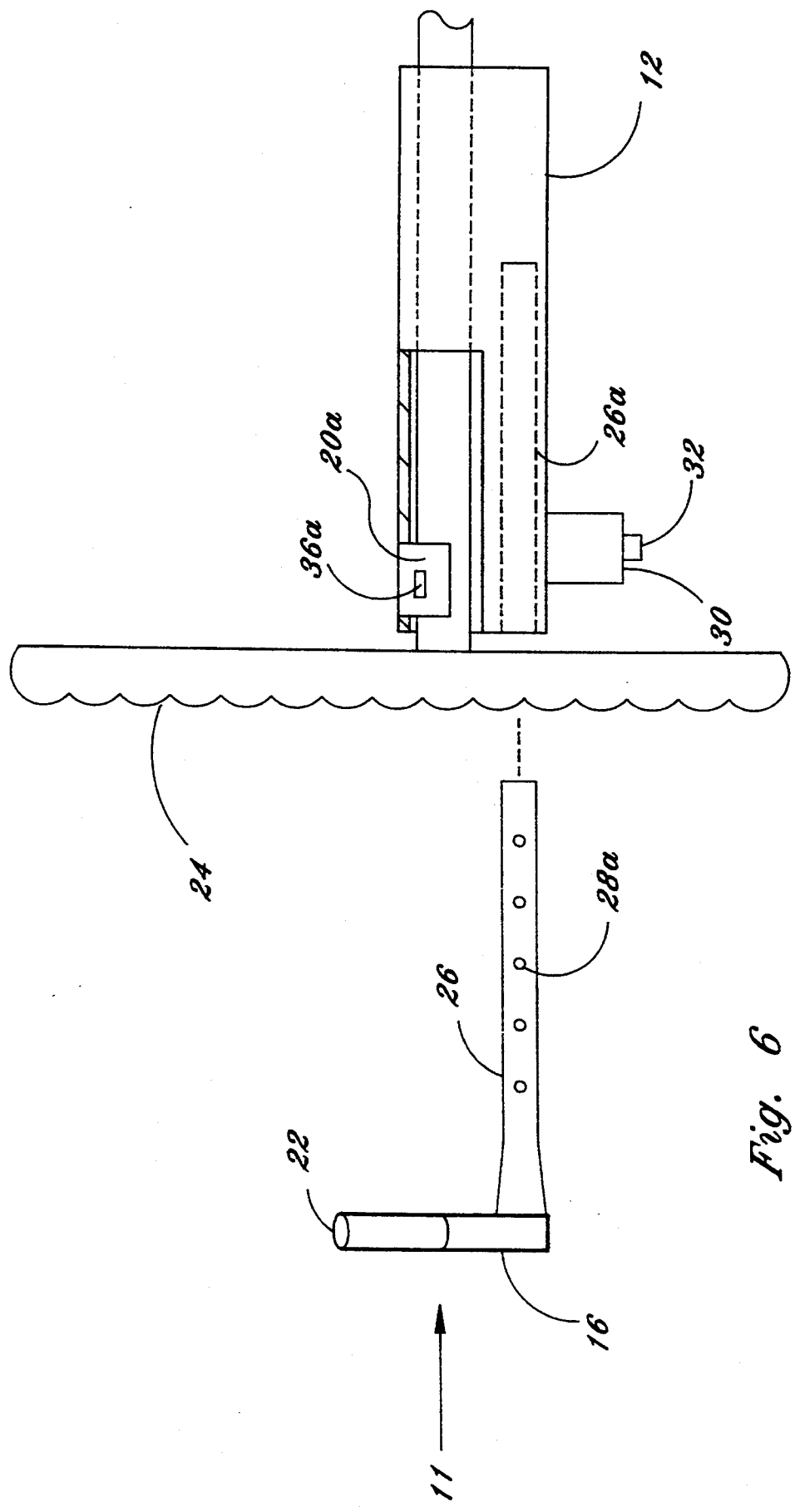
FIG. 6 shows a side elevational view exploded of the present invention.

With reference to FIG. 6, the passage 26a is a channel defined by housing 12, as shown. Passage 26a receives rigid shaft 26 to prevent the steering wheel 24 from rotating by blocking the spokes of the steering wheel 24.

FIG. 7 illustrates the ignition cover 20 which is secured into the permanent housing 12 by a locking mechanism 32. The ignition cover 20 is generally rigid, hollow and cylindrical and includes a face plate 30a at one end that receives the locking mechanism 32. The locking mechanism 32 is key actuated whereby locking mechanism 32 includes a key aperture 32a to receive the key to allow rotation of the actuating member 36 to permanently attach the device to housing 12. The housing 30 is hollow so that it can fit securely over the automobile ignition for protection. Meanwhile the actuating member 36 penetrates a slot 36a defined by the permanent housing 12 when rotated by key to lock housing 30 in place as seen in FIGS. 1 and 10.

The entire ignition cover 20 is removable from the steering column housing 12 as seen in FIG. 6, exposing aperture 20a.

To operate the instant invention 10, the permanent housing 12 is mounted to the steering column 14 and secured thereto with fasteners 27 which are installed through housing apertures 28 into the column 14. The steering wheel barrier is then mounted to housing 12 by inserting the tubular shaft 26 into channel 26a and securing it with at least one locking pin or fastener 27 as they are inserted into apertures 28a and 28. The arms 22 are held during the mounting until the central frame 16 is in place as shown in FIG. 1. Once the device is mounted and secured with locking pins 27 the ignition cover 20 is locked in aperture 20a by locking mechanism 32 with a key so as to cover and protect the ignition, and locking mechanism 32' may be actuated with the same key so as to lock the shaft 26 into housing aperture 26a. Accordingly, the steering wheel 24 is incapable of turning because the shaft 26 blocks the steering wheel spokes 29 and the auto ignition is concealed from a possible thief.

By the use of the present invention, the stealing of an automobile or truck is made extremely difficult. The steering wheel is locked in place preventing rotation and the ignition is inaccessible.

An alternate embodiment as shown in FIG. 11 utilizes a conventional digital manually-actuated locking device 20' to eliminate the need for a key. Instead, a particular numerical code is entered to release the ignition switch cover 20'. The device may also be employed for locking the steering wheel barrier in place.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A steering wheel locking device that prevents rotation of a conventional vehicle steering wheel and access to a conventional vehicle ignition switch, said device comprising:

a steering column housing permanently mounted around a steering column of a vehicle, said steering column housing defining a first channel for receiving the steering column, said steering column housing defining a second channel;

means for securely fastening said steering column housing to the steering column to prevent movement of said column housing;

a steering wheel barrier releasably mounted to said steering column housing for preventing the rotation of said steering wheel, said barrier having a central frame with an elongated shaft projecting from said frame, said shaft intersecting said steering wheel and mating with said second channel in a first, locked position to block movement of steering wheel spokes, said shaft separate from said second channel in a second, unlocked position to allow driving, said central frame supporting said shaft and facilitating movement of said shaft between said first and second positions;

means for locking said barrier to said steering column housing in said first position, said means for locking rigidly attached to said steering column housing; and means for covering the vehicle ignition switch to conceal the ignition switch, said means for covering releasably attached to said steering column housing.

2. A device as recited in claim 1, wherein said means for securely fastening comprises:
   at least one fastening pin; and
   at least one fastening aperture defined by said steering column housing for receiving said fastening pin, said fastening pin engaging the steering column, thereby securing said steering column housing to the steering column.

3. A device as recited in claim 1, wherein said means for locking comprises:
   a key actuated locking mechanism for facilitating locking and unlocking of said barrier with a key;
   at least one aperture defined by said steering column housing proximal to said second channel; and
   at least one aperture defined by said shaft in alignment with said steering column aperture when said shaft is in said first locked position.

4. A device as recited in claim 1, wherein said central frame further comprises at least one bar projecting radially from said central frame to facilitate movement of said shaft between said first locked position and said second unlocked position.

5. A device as recited in claim 1, wherein said ignition switch covering means comprises:
   an ignition cover;
   an ignition aperture defined by said steering column housing in alignment with the vehicle ignition switch, said ignition aperture for receiving and attaching said ignition cover to said column housing; and
   a key locking mechanism permanently attached to said ignition cover for locking said ignition cover to said steering column housing.

6. The device as recited in claim 5, wherein said key locking mechanism comprises:
   a slot defined by said steering column housing; and
   a key actuating member rotatably disposed in said ignition cover and in registry with said slot for interlocking with said slot when rotated by a key, said key actuating member being substantially L-shaped.

7. A steering wheel locking device that prevents rotation of a conventional vehicle steering wheel and access to a conventional vehicle ignition switch, said device comprising:

a steering column housing permanently mounted around a steering column of a vehicle, said steering column housing defining a first channel for receiving the steering column, a second channel, and a vehicle ignition aperture;

means for securely and rigidly fastening said steering column housing to the steering column, said means for fastening including at least one fastening aperture defined by said steering column housing and at least one fastening pin for mating with said fastening aperture;

a steering wheel barrier releasably mounted to said steering column housing for preventing the rotation of said steering wheel, said barrier having a central frame with an elongated shaft projecting from said frame, said shaft intersecting said steering wheel and mating with said second channel in a first, locked position to block movement of steering wheel spokes, said shaft separate from said second channel in a second, unlocked position to allow driving, said central frame supporting said shaft and facilitating movement of said shaft between said first and second positions;

a key actuated locking mechanism for facilitating locking and unlocking of said barrier with a key; and at least one aperture defined by said steering column housing proximal to said second channel;

a vehicle ignition cover releasably attached to said vehicle ignition aperture for concealing the vehicle ignition aperture; and a key locking mechanism permanently attached to said ignition cover for locking said ignition cover to said steering column housing.

8. A steering wheel locking device that prevents rotation of a conventional vehicle steering wheel having spokes comprising:

a steering column housing mounted around a steering column of a vehicle, said steering column housing defining a first channel for receiving the steering column, said steering column housing further defining a second channel;

means for securely fastening said steering column housing to the steering column to prevent movement of said steering column housing;

means for preventing rotation of the steering wheel, said rotation preventing means removably mated with said second channel and disposed between the spokes of the steering wheel when mated with said second channel, said rotation preventing means having a central frame for supporting said rotation preventing means and for aiding in moving said rotation preventing means between a first, locked position inside said second channel and a second, unlocked position outside said second channel;

means for locking said rotation preventing means to said steering column housing;

means for covering a vehicle ignition to conceal the vehicle ignition, said ignition covering means releasably attached to said steering column housing; and a key locking mechanism permanently attached to said ignition covering means for locking said ignition covering means to said steering column housing.

9. The device as recited in claim 8, wherein said ignition covering means comprises:

an ignition cover; and an ignition aperture defined by said steering column housing in alignment with the vehicle ignition, said ignition aperture for receiving and attaching said ignition cover to said steering column housing.

10. The device as recited in claim 9, wherein said key locking mechanism comprises:

a slot defined by said steering column housing; and a key actuating member rotatably disposed in said ignition cover and in registry with said slot for interlocking with said slot when rotated by a key.

* * * * *